(12) United States Patent
Kim

(10) Patent No.: US 9,933,042 B2
(45) Date of Patent: Apr. 3, 2018

(54) ROBOCHAIN AND CONNECTING MEMBERS USED IN THE SAME

(71) Applicant: HANSHIN CHAIN CO., LTD., Siheung-si (KR)

(72) Inventor: Du Jin Kim, Seoul (KR)

(73) Assignee: HANSHIN CHAIN CO., LTD., Siheung-si, Gyeonggi-do (KR)

( * ) Notice: Subject to any disclaimer, the term of this patent is extended or adjusted under 35 U.S.C. 154(b) by 729 days.

(21) Appl. No.: 14/399,320

(22) PCT Filed: Feb. 26, 2013

(86) PCT No.: PCT/KR2013/001545
§ 371 (c)(1),
(2) Date: Nov. 6, 2014

(87) PCT Pub. No.: WO2013/168887
PCT Pub. Date: Nov. 14, 2013

(65) Prior Publication Data
US 2015/0121834 A1    May 7, 2015

(30) Foreign Application Priority Data

May 7, 2012   (KR) .................. 10-2012-0048194

(51) Int. Cl.
*F16G 13/16*   (2006.01)
*H02G 11/00*   (2006.01)

(52) U.S. Cl.
CPC .......... *F16G 13/16* (2013.01); *H02G 11/006* (2013.01)

(58) Field of Classification Search
CPC ............. F16G 13/16; F16G 13/00; F16L 3/14
USPC ........................................................ 59/78.1
See application file for complete search history.

(56) References Cited

U.S. PATENT DOCUMENTS

| 6,745,555 | B2 * | 6/2004  | Hermey | H02G 11/006 248/49 |
| 7,310,937 | B2 * | 12/2007 | Kim    | F16G 13/16 248/49 |
| 7,669,402 | B2 * | 3/2010  | Blase  | F16G 13/16 248/49 |

(Continued)

FOREIGN PATENT DOCUMENTS

| DE | 102007061296 | 8/2008 |
| JP | 63124867     | 8/1988 |
| JP | 2000249128   | 9/2000 |

(Continued)

OTHER PUBLICATIONS

Translation of International Search Report for International Application No. PCT/KR2013/001545, dated Apr. 22, 2013, 2 pages.

*Primary Examiner* — David B Jones
(74) *Attorney, Agent, or Firm* — Michael Best & Friedrich LLP

(57) ABSTRACT

A robochain including a plurality of link units, a connecting member (1300) between the link units, a hollow part formed inside the link unit (1100) for enabling the connecting member (1300) to be detachably attached to each of the link units, and a neck part (1316) formed in the connecting member (1300) for preventing the connecting member (1300) from being easily detached from the hollow part (1118). Repair of a link plate is facilitated by simply separating the engaging part of the connecting member from the hollow part.

3 Claims, 5 Drawing Sheets

(56) References Cited

U.S. PATENT DOCUMENTS

2015/0121834 A1* 5/2015 Kim ..................... H02G 11/006
                                                                                  59/78.1

FOREIGN PATENT DOCUMENTS

| JP | 4111987 B1 | 7/2008 |
| JP | 2011127716 | 6/2011 |
| KR | 10-2004-0014505 A | 2/2004 |
| KR | 20-0370351 Y1 | 12/2004 |
| KR | 10-0517779 B1 | 9/2005 |
| KR | 10-0591274 B1 | 6/2006 |

* cited by examiner

ROBOCHAIN AND CONNECTING MEMBERS USED IN THE SAME

CROSS-REFERENCE TO RELATED APPLICATIONS

This application is a Section 371 U.S. National Phase Application of International Application PCT/KR2013/001545, filed Feb. 26, 2013, which claims priority to Korean Patent Application No. 10-2012-0048194, filed May 7, 2012, the entire contents all of which are hereby incorporated by reference herein.

FIELD OF THE INVENTION

The present invention relates to a robochain used in an industrial field in which various machines are used, and connecting members used in the same.

BACKGROUND

A robochain used in an industrial field in which various machines are used is a safety apparatus for moving a reciprocating hydraulic/pneumatic hose, cable, and so on, at the same angle as the safety apparatus, and protecting them from moisture, dusts, and so on.

The robochain enables a machine to be more safely operated because the robochain applies to the same intensity to the hydraulic/pneumatic hose and cable for supplying electric power or a pressure to the machine while the hydraulic/pneumatic hose and cable are reciprocated in a protective apparatus.

In the robochain of the related art, a connecting rod is inserted into through-holes of link plates to connect the link plates. However, fastening of the connecting rod is inconvenient, and when one of the link plates should be repaired, the all of the link plates are released due to separation of the connecting rod to make a repair operation inconvenient.

SUMMARY

An object of the present invention is to provide a robochain having a structure capable of simply fastening connecting members used to connect link plates.

Another object of the present invention is to provide a robochain having a structure capable of facilitating a repair operation thereof.

In order to achieve the aforementioned objects, the present invention provides a robochain including a plurality of link units; connecting members (1300) configured to connect the link units; concave sections (1118) formed inside the link units (1100) such that the connecting members (1300) are detachably coupled to the link units; and neck sections (1316) formed at the connecting members (1300) such that the connecting members (1300) are not easily separated from the concave sections (1118) in the fastened state.

The concave section may include an introduction section (1120); a narrow groove section (1122) formed at a central inner side of the introduction section (1120) and having a diameter smaller than that of the introduction section (1120); and an inlet port (1124) of the narrow groove section (1122) having a diameter smaller than an inner diameter of the narrow groove section (1122).

The connecting member (1300) may include a linear section (1340) configured to connect fastening sections (1310, 1320) connected to two concave sections (1116, 1118) formed at the one link unit; and a curved section (1350) configured to connect fastening sections (1320, 1330) coupled to concave sections (1118, 1116a) formed at the neighboring two link units.

The fastening section may include a cover section (1318) extending from a convex section (1312) corresponding to a shape of the introduction section (1120) and having a diameter larger than that of the convex section (1312).

The present invention also provides a connecting member used in a robochain, the connecting member including a fastening section (1310) introduced and fastened to a concave section formed at a plate (1110) of the robochain; and a connecting section (1360) configured to connect fastening sections (1320) adjacent to the fastening section.

The fastening section (1310) may include a convex section (1312); an end protrusion (1314) extending from the convex section (1312); and a neck section (1316) formed between the convex section (1312) and the end protrusion (1314) and having a diameter smaller than that of the end protrusion (1314).

The connecting section (1360) may include a linear section (1340) and a curved section (1350).

According to the present invention, since only the coupling section of the connecting members, at which a link plate to be repaired is disposed, can be separated from the concave section, a repair operation of the link plate can be conveniently performed.

In addition, since the fastening section is not easily separated from the concave section due to a shape of the neck section of the fastening section and the cover section can cover a circumference of the introduction section in which the convex section is placed, it is possible to prevent the convex section and the introduction section from coming in contact with the hydraulic/pneumatic hose, cable, and so on, disposed inside the link unit.

Accordingly, the fastening section can securely maintain the coupling to the concave section by the cover section.

Even when the link units adjacent to each other due to the shape of the curved section are rotated about the bent portion, the connecting section is not damaged or deformed.

DETAILED DESCRIPTION

Figure 1:
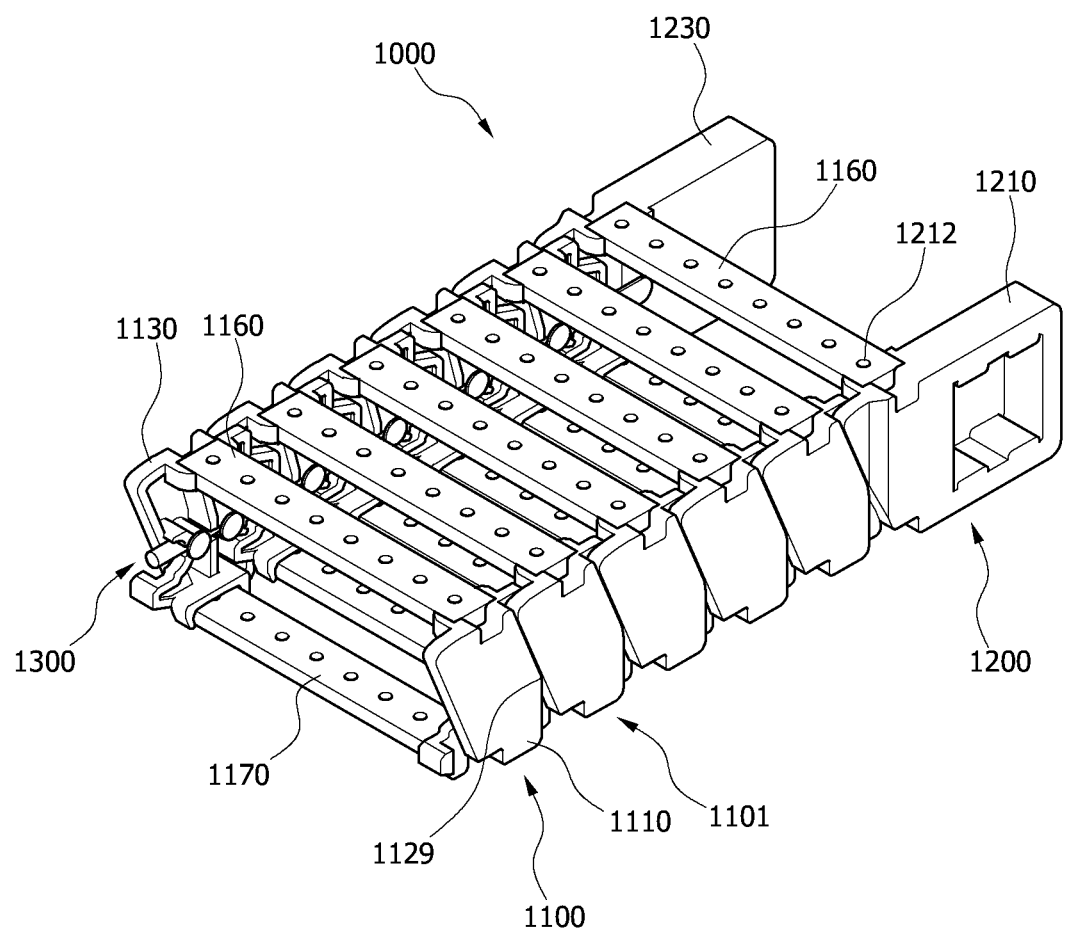
FIG. 1 is a perspective view showing a robochain according to the present invention.

Hereinafter, an embodiment of the present invention will be described with reference to the accompanying drawings. First, throughout the specification, the same components are represented by the same reference numerals hereinafter. For the purpose of simplification and clarification of illustration, the drawings show conventional configurations, and known characteristics and detailed description of techniques may be omitted to avoid description of the embodiments from becoming unnecessary unclear.

Figure 2:
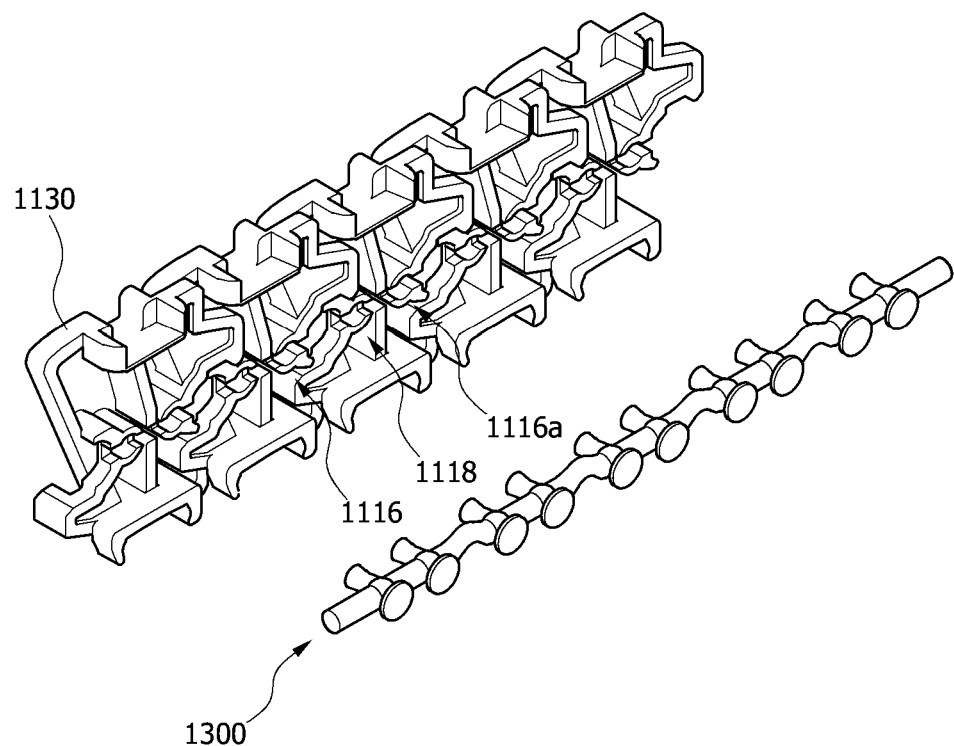
FIG. 2 is a perspective view showing a portion of FIG. 1.
Figure 3:
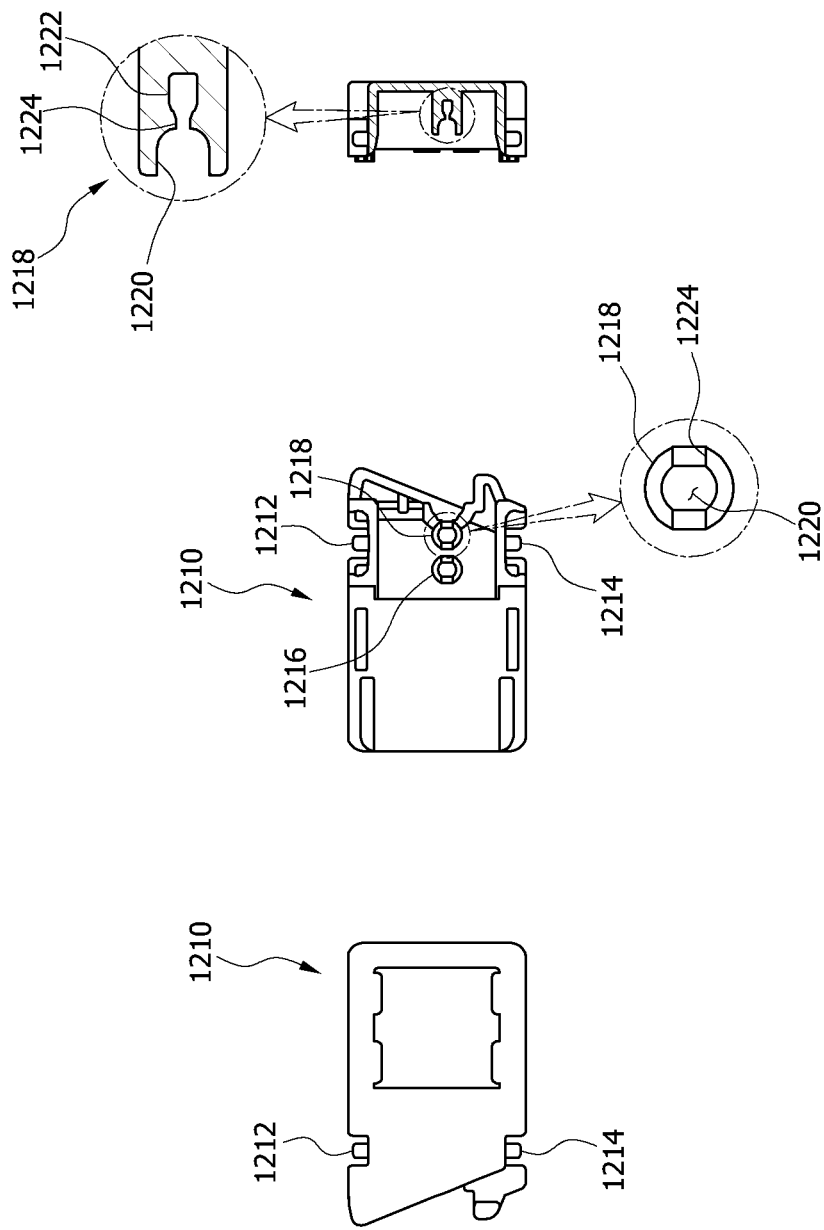
FIG. 3 is a product view showing a plate of a reference link unit of FIG. 1.

FIG. 1 is a perspective view showing a robochain according to the present invention, FIG. 2 is a perspective view showing a portion of FIG. 1, and FIG. 3 is a product view showing a plate of a reference link unit of FIG. 1.

A robochain 1000 according to the present invention includes a plurality of link units 1100 and 1200, and a connecting member 1300 configured to connect the link units 1100 and 1200.

The link units 1100 and 1200 include link plates 1110, 1130, 1210 and 1230 of both sides spaced a certain range from each other, an upper plate 1160 configured to connect upper portions of the link plates 1110, 1130, 1210 and 1230 of both sides, and a lower plate 1170 configured to connect lower portions of the link plates 1110, 1130, 1210 and 1230 of the both sides.

However, the link units 1100 and 1200 are classified as the reference link unit 1200 formed at a position at which the link unit starts, and the intermediate link units 1100 and 1101 connected to the reference link unit 1200.

Both of the reference plates 1210 and 1230 of the reference link unit 1200 have different shapes from both of the intermediate plates 1110 and 1130 of the intermediate link unit 1100.

Since the left reference plate 1230 and the right reference plate 1210, which are both of the reference plates 1210 and 1230, are symmetrically formed, only a structure of the right reference plate 1210 will be described.

The right reference plate 1210 has a protrusion 1212 formed at an upper portion thereof and to which a coupling hole of the reference upper plate 1160 is coupled, and a protrusion 1214 formed at a lower portion thereof and to which a coupling hole of the reference lower plate 1170 is coupled.

In addition, two reference concave sections 1216 and 1218 in which the connecting member 1300 formed at an inner surface of the reference link unit 1200 is detachably coupled in a direction perpendicular to a longitudinal direction of the robochain 1000 are formed in the right reference plate 1210.

The two reference concave sections 1216 and 1218 are formed to maintain a stronger coupling force, the reference concave section 1218 has an introduction section 1220 curved outward in a substantially hemispherical shape, and a narrow groove section 1222 formed to be more deeply formed inward at a center of the introduction section 1220 and having a diameter smaller than that of the introduction section 1220 is formed.

In addition, an inlet port 1224 of the narrow groove section 1222 serving as a boundary between the introduction section 1220 and the narrow groove section 1222 has a diameter smaller than an inner diameter of the narrow groove section 1222.

The introduction section 1220 of the reference concave section 1218 has the cutout section 1224 formed in a direction of the introduction section adjacent thereto.

A left intermediate plate 1130 and a right intermediate plate 1110, which are both of the intermediate plates 1110 and 1130 that constitute the intermediate link unit 1100, have shapes symmetrical to each other, and a shape of the right intermediate plate 1110 will be described hereinafter.

Figure 4:
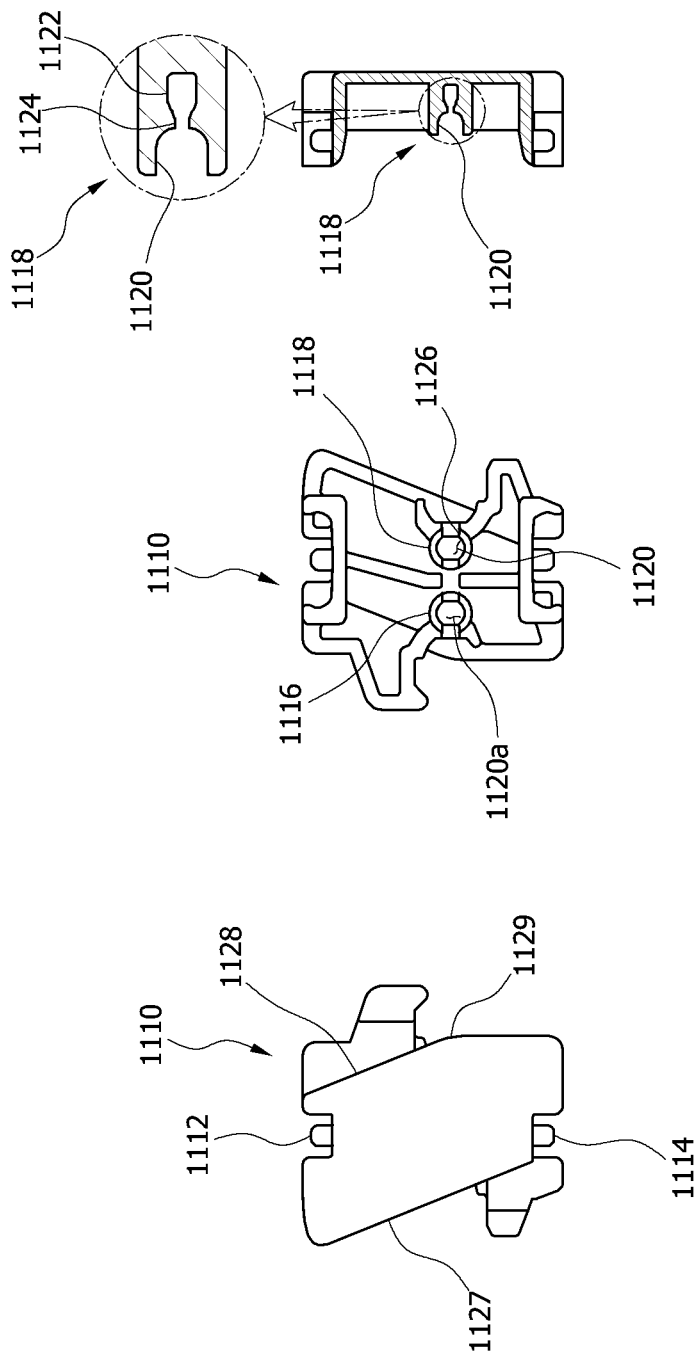
FIG. 4 is a product view showing a right intermediate plate of an intermediate link unit of FIG. 1.

FIG. 4 is a product view showing the right intermediate plate of the intermediate link unit of FIG. 1.

The right intermediate plate 1110 has protrusions 1112 and 1114 formed at upper and lower portions, to which the upper plate 1160 and the lower plate 1170 are coupled.

In addition, two intermediate concave sections 1116 and 1118 of the right intermediate plate 1110 to which the connecting member 1300 is coupled are formed at an inner surface of the intermediate link unit 1100.

The connecting member 1300 is detachably coupled to the intermediate concave sections 1116 and 1118 in a direction perpendicular to the longitudinal direction of the robochain 1000.

The intermediate concave sections 1116 and 1118 have introduction sections 1120 having the same shapes as the reference concave sections 1216 and 1218 and concaved in a substantially hemispherical shape, and narrow groove sections 1122 more deeply formed inward at a center of the introduction section 1120 and having a diameter smaller than that of the introduction section 1120.

In addition, an inlet port 1124 of the narrow groove section 1122 serving as a boundary between the introduction section 1120 and the narrow groove section 1122 has a diameter smaller than an inner diameter of the narrow groove section 1122.

In addition, the introduction section 1120 has the cutout section 1126 formed in a direction of the introduction section 1120a adjacent thereto.

The right intermediate plate 1110 has left and right inclined surface formed at an outer surface of the intermediate link unit 1100. The left inclined surface 1127 has substantially the same shape, and a right inclined surface 1128 has an inclined surface formed from upward to downward and in parallel with the left inclined surface 1127 and a bent portion 1129 bend vertically under an intermediate portion.

The left inclined surface 1127 and the right inclined surface 1128 are formed to be rotated between the link units 1100 and 1101 adjacent to each other with reference to the bent portion 1129, and shapes of the left inclined surface 1127 and the right inclined surface 1128 may be varied or freely deformed according to necessity as long as the link units 1100 and 1101 can be rotated with reference to the bent portion 1129.

In addition, the bent portion 1129 is formed on the same horizontal plane as the position at which the cutout sections 1126 and 1224 of the introduction sections 1120 and 1220 are formed.

Figure 5:
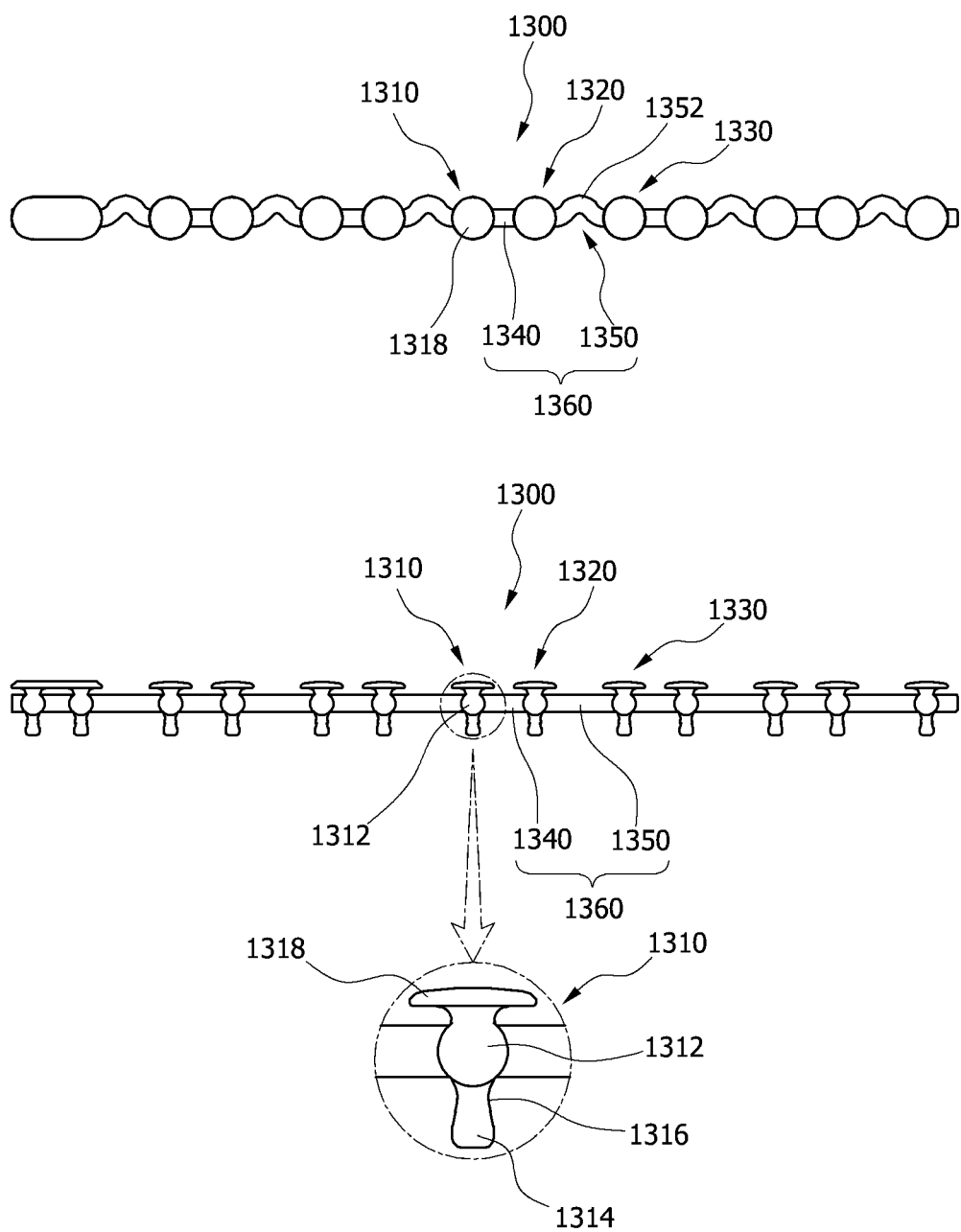
FIG. 5 is a product view showing a connecting member of the present invention.

FIG. 5 is a product view showing a connecting member according to the present invention.

Meanwhile, the connecting member 1300 includes fastening sections 1310, 1320 and 1330 introduced and fastened to the intermediate concave sections 1116 and 1118 formed in the one plate 1110, and a connecting section 1360 configured to connect the fastening sections 1310 and the fastening sections 1320 adjacent thereto.

The fastening sections 1310 includes a convex section 1312 corresponding to a shape of the introduction section 1120, an end protrusion 1314 extending from the convex section 1312 and inserted into the narrow groove section 1122, a neck section 1316 disposed at the inlet port 1124 of the narrow groove section 1122, and a cover section 1318 extending from the convex section 1312 to be disposed outside the introduction section 1120 and having a diameter larger than that of the convex section 1312.

A diameter of the neck section 1316 is smaller than that of the end protrusion 1314.

The fastening sections 1310 are not easily separated from the concave section 1118 in a fastened state due to the shape of the neck section 1316, and the fastening sections 1310 can cover a circumference of the introduction section 1220 attached to the convex section 1312 by the cover section 1318 to prevent the convex section 1312 and the introduction section 1120 from coming in contact with the hydraulic/pneumatic hose, cable, or the like, disposed inside the link units 1100 and 1200.

Accordingly, the fastening sections 1310 can also securely maintain the coupling to the concave section 1118 by the cover section 1318, and can also prevent the hydraulic/pneumatic hose, cable, or the like, from coming in contact with the convex section 1312 or the introduction section 1120 and damage thereof.

In addition, the connecting section 1360 is formed to include two types, a first type is a linear section 1340 connecting fastening sections 1310 and 1320 coupled to the two intermediate concave sections 1116 and 1118 formed in the one plate 1110, and a second type is a curved section 1350 connecting fastening sections 1320 and 1330 coupled to intermediate concave sections 1118 and 1116*a* formed in two plates adjacent to each other.

Both ends of the curved section 1350 adjacent to the fastening sections 1320 and 1330 have the same shape as the linear section 1340, and a curved convex section 1352 is formed in only a center portion thereof.

Since the connecting section 1360 is placed in the cutout section 1224 formed in the introduction section 1118 and the linear section 1340 is disposed in the one plate, the neighboring plates are not affected even when the plates are rotated with reference to the bent portion 1129. In addition, since the curved section 1350 is disposed between the neighboring two plates, the curved convex section 1352 is mounted to be directed upward such that the neighboring plates are naturally deformed by rotation when rotated about the bent portion 1129.

Even when the neighboring link units 1100 and 1101 are rotated about the bent portion 1129 by the shape of the curved section 1350, the connecting section 1360 is not damaged or deformed.

According to the present invention having the above-mentioned configuration, the connecting member 1300 can simply connect the link plates through a process of inserting the coupling section of the connecting member 1300 into the concave section formed in the plate, and the robochain 1000 having a simple coupling structure can be provided.

In addition, since the coupling section to the connecting member 1300 of the portion at which the link plate to be repaired is disposed is merely separated from the concave section, the repair of the link plate can be conveniently performed.

In addition, the robochain of the present invention is not easily separated from the concave section in the fastened state due to the shape of the neck section 1316 of the fastening sections 1310, and the cover section 1318 can cover the circumference of the introduction section 1220 in which the convex section 1312 is placed to prevent the convex section 1312 and the introduction section 1220 from coming in contact with the hydraulic/pneumatic hose, cable, or the like, disposed inside the link units 1100 and 1200.

Accordingly, the fastening sections 1310 can securely maintain the coupling to the concave section by the cover section 1318.

Even when the neighboring link units 1100 and 1200 are rotated about the bent portion 1129, the connecting section 1360 is not damaged or deformed due to the shape of the curved section 1350.

An embodiment of the invention has been discussed above with reference to the accompanying drawings. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention.

The robochain used in an industrial field in which various machines are used is a safety apparatus for moving a reciprocating hydraulic/pneumatic hose, cable, and so on, at the same angle as the safety apparatus, and protecting them from moisture, dusts, and so on. The robochain and the connecting members used in the same of the present invention can be used in the related fields.

The invention claimed is:

1. A robochain comprising:
a plurality of link units, each of the link units having an inner surface defining first and second concave sections (1116, 1118); and
connecting members (1300) that are detachably coupled to the link units, the connecting members (1300) include
neck sections (1316) that are configured to engage the concave sections (1800) such that the connecting members (1300) are not easily separated from the concave sections (1118) in a fastened state,
first, second and third fastening sections (1310, 1320, 1330),
a linear section (1340) configured to connect the first and second fastening sections (1310, 1320), the first and second fastening sections (1310, 1320) are sized to be inserted into the respective first and second concave sections (1116, 1118) of a first link unit, and
a curved section (1350) configured to connect the second and third fastening sections (1320, 1330), the third fastening section (1330) configured to be inserted into a first concave section (1118) of a second link unit.

2. The robochain according to claim 1, wherein each of the fastening sections comprises a cover section (1318) extending from a convex section (1312), and the first and second concave sections (1116, 1118) each include an introduction section (1120), each of the cover sections (1318) has a shape corresponding to a shape of the respective introduction section (1120) and has a diameter larger than that of the convex section (1312).

3. A connecting member used in a robochain, the robochain including a plate (1110) having a concave section, the connecting member comprising:
a first fastening section (1310) introduced and fastened to the concave section formed at the plate (1110) of the robochain; and
a connecting section (1360) configured to connect second and third fastening sections (1320, 1330) to the first fastening section,
wherein the connecting section (1360) comprises a linear section (1340) and a curved section (1350).

* * * * *